United States Patent [19]

Notaro

[11] 4,383,976
[45] May 17, 1983

[54] OZONE-GENERATING ASSEMBLY

[76] Inventor: Salvador P. Notaro, Pico 2347, 1429 Buenos Aires, Argentina

[21] Appl. No.: 136,382

[22] Filed: Apr. 1, 1980

[30] Foreign Application Priority Data

Dec. 27, 1979 [AR] Argentina ............................. 279484

[51] Int. Cl.³ .......................................... C01B 13/11
[52] U.S. Cl. .......................... 422/186.18; 422/186.14
[58] Field of Search ...................... 250/539, 538, 532; 422/186.18, 186.14

[56] References Cited

U.S. PATENT DOCUMENTS

| 935,457 | 9/1909 | Bridge | 250/539 |
| 1,010,777 | 12/1911 | Leggett | 250/539 |
| 2,155,675 | 4/1939 | Napier | 250/539 |
| 2,658,868 | 11/1953 | Collison | 250/539 |
| 3,455,803 | 11/1965 | Miller | 250/539 |

FOREIGN PATENT DOCUMENTS 781914 4/1968 Canada .
615 of 1897 United Kingdom .

Primary Examiner—L. Dewayne Rutledge
Assistant Examiner—J. J. Zimmerman
Attorney, Agent, or Firm—Emory L. Groff, Jr.

[57] ABSTRACT

An ozone generating apparatus comprising a plurality of ozone generating tubes affixed to said apparatus by threaded connectors for easy disassembly.

1 Claim, 6 Drawing Figures

OZONE-GENERATING ASSEMBLY

The present invention refers to an assembly for the generation of ozone and consisting of a single receptacle or of similar receptacles to be connected as a battery, designed to receive ozone generating tubes; and of the air or oxygen feed lines from a distributor, to provide a versatile ozone-generating device having a series of novel structural and functional features offering evident practical advantages in their use and application for the purpose as specified.

Present-day technical necessity, in connection with the sundry recourses available for the production of ozone, required that certain norms be observed, following a logical order, such as: high efficiency, minimum maintenance, operational simplicity, low power consumption and, what is more important, the possibility of using 50–60 cycle alternating current and tensions below 5000 volts.

At present, the most advanced and efficient ozone producing systems use tensions varying between 12,000 and 20,000 volts. This greatly shortens the life of the discharge tube dielectrics, to which must be added the problems caused by the loss of power being transformed into heat, which heat must be removed by cooling systems still further complicating the equipment and increasing power input and maintenance.

The heavy or giant ozonizers on an industrial scale suffer from the inconvenience of requiring tensions above 10,000 volts and give rise to chemical, so-called "poisoning" reactions of the equipment cells themselves, forming acids, oxides and peroxides which are harmful and affect the equipment itself and its efficiency. It is also necessary to feed these installations with pure oxygen and not with air in order not to still further aggravate these problems. A loss in yield is the logical consequence.

There are also the so-called "ozone tubes" consisting of a cylindrical metal mesh connected to a pole of the high-voltage current. This tubular mesh is arranged to surround a rod-shaped electrode, coaxial to the tube and connected to the other pole by means of a connector-support in turn supporting the entire assembly.

These tubes are housed in receptacles which are more or less adapted to them and their function is to allow the oxygen or air to pass and to collect the ozone that has been generated. Such receptacles are designed to more or less comply with their function but, due to their precariousness, they incur losses which diminish their efficiency as well as the concentration of the ozone. They are also potentially dangerous in the sense that they require the manipulation of electric current. Therefore, in order to avoid such danger, medium-voltage (2000 Volt) currents are used.

In other words, there does not exist in the market an integrated and versatile device permitting the generation of ozone in a rational manner and on an industrial scale.

All these difficulties are corrected by means of the present invention inasmuch as same comprises the utilization of connecting supports for the tubes. These supports are also novel and, owing to the particular features of the receptacle, the manner in which they are connected and the particular design of their components, the generating devices are completely hermetic and it is possible to couple two or more receptacles to form a battery, according to the quantity of ozone to be produced. Furthermore, high-voltage current is used and the live pole is entirely separated from the oxydizing ambient. Thus a higher yield and concentration of ozone is obtained by means of a compact and versatile equipment having optimum finish and and manner of functioning.

Ozone generators are known having a short lead for connecting the feed current. The manner in which the corresponding tubes are used can differ and may be individually or in battery connection. Consequently, at present, the connections are made in a precarious manner and the same short lead serves to support the tube, with the consequent loss of time, defective tube support and lack of facility in handling the assembly.

In order to select the conditions obviating all these drawbacks, the present invention uses a support-connector by means of which it is possible to mount and to demount the ozone generating tubes and to accomplish electrical connection in a prompt and safe manner, appropriate for any type of combination and change.

Therefore, the present invention proposes an assembly for generating ozone by means of generating tubes of the type consisting of a rod electrode mounted inside a tube and connected to an electric current pole, said tube being covered by a cylindrical casing consisting of a metal mesh connected to the other pole, this assembly being characterized in that it comprises at least one hermetic cylindrical receptacle, arranged vertically and inserted in a supporting plate, said receptacle housing coaxially a generator tube provided with said metal mesh connected to one of the current poles by means of a spiral spring applied against said mesh and affixed to the end of a through bolt screwed into the wall of said receptacle from the outside thereof and in electrical connection with the aforesaid electric pole, the other pole of the tube being affixed to an adapting cover arranged in the upper aperture of the receptacle and provided with a connector support carrying said electric pole, including a bus bar in series connection with the lower portion of the receptacle and connected in turn, at the outlet thereof, to a vacuum source, furthermore comprising an air-oxygen distributor consisting of an elongated receptacle connected by the ends thereof to an air or oxygen feed source, said distributor being connected with the inside of the receptacle by means of a riser tube section, rising from the distributor towards the receptacle.

Another object of the invention is a support-connector consisting of a cylindrical tube, threaded on the outside and preferably made of stiff plastic material. The inside perimeter of this tube, at one end thereof, is provided with an annular step providing a seat for a circular cover which carries the female part of a plug-type connecting system, said filament or short lead being connected to said female part and the cylindrical part including a pair of nuts screwed on the peripheral thread. These nuts are tightened against the wall of the connection box or panel.

The invention likewise envisages other accessory objects that will be made clear during the course of the present specification.

In order that the present invention may be clearly understood and readily put into practice, same has been illustrated as an example and in one of its preferred embodiments in the drawings which accompany the present specification and in which.

Like numerals represent like or similar parts throughout the several figures of the drawings.

Figure 1:
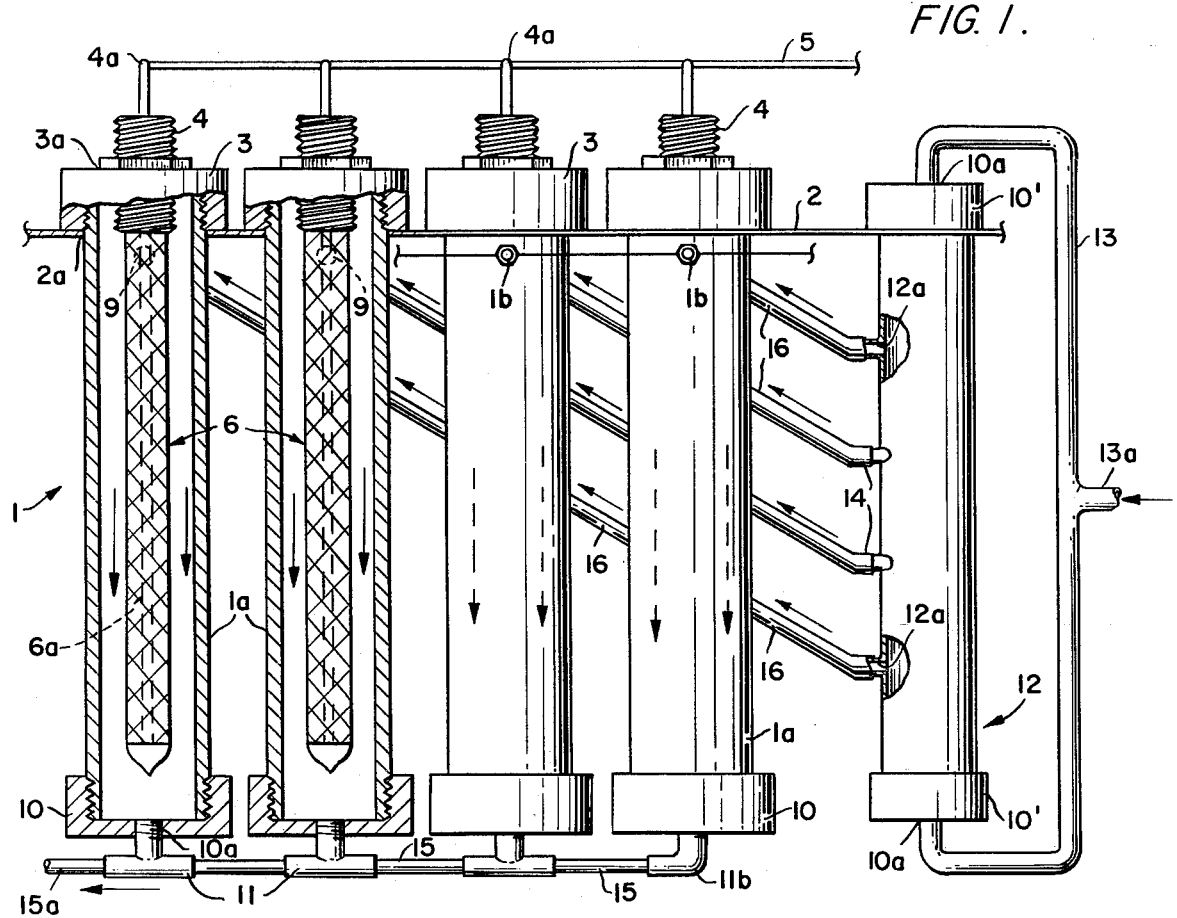
FIG. 1 is an elevational view of said ozone generator assembly.
Figure 2:
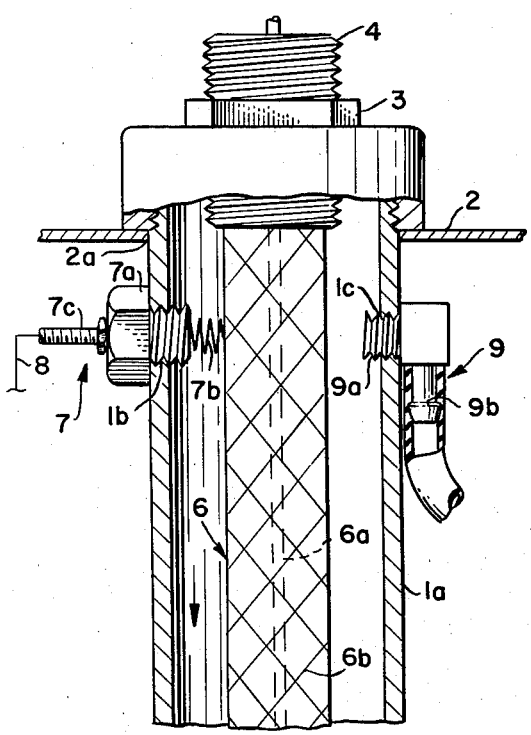
FIG. 2 is a view, partially in section, of one of the ozone generator tubes.
Figure 3:
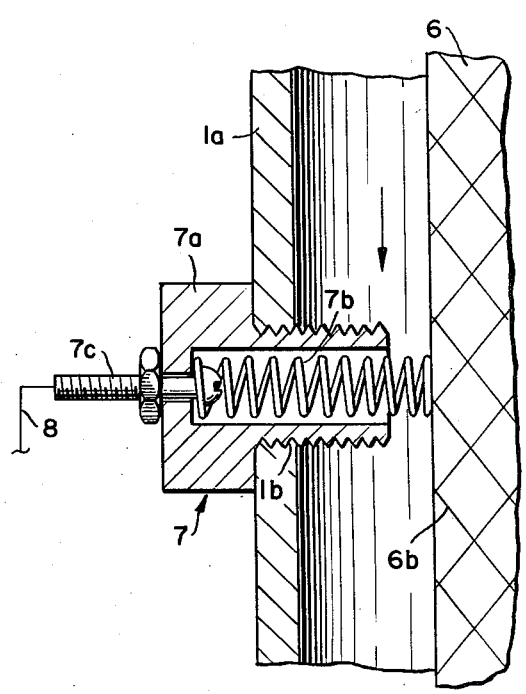
FIG. 3 is an enlarged sectional detail of one of the elements comprising each generator tube.
Figure 4:
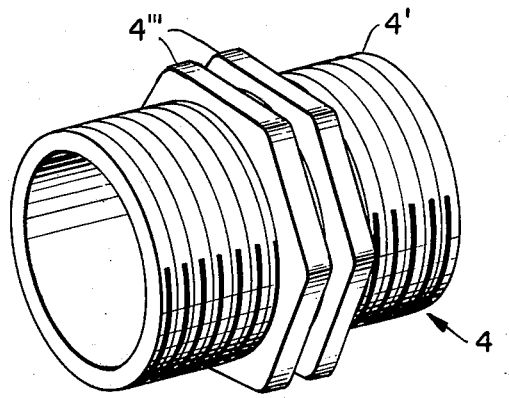
FIG. 4 is a perspective view of the connector support.
Figure 5:
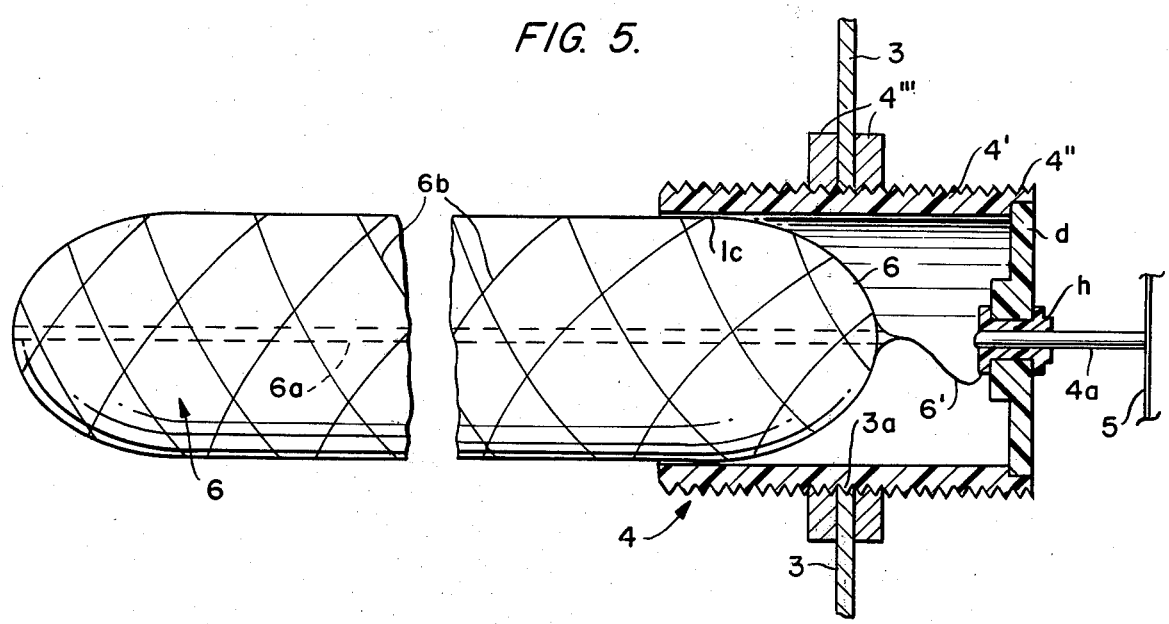
FIG. 5 illustrates a lengthwise section of the connector support, with the ozone tube mounted and electrically connected.
Figure 6:
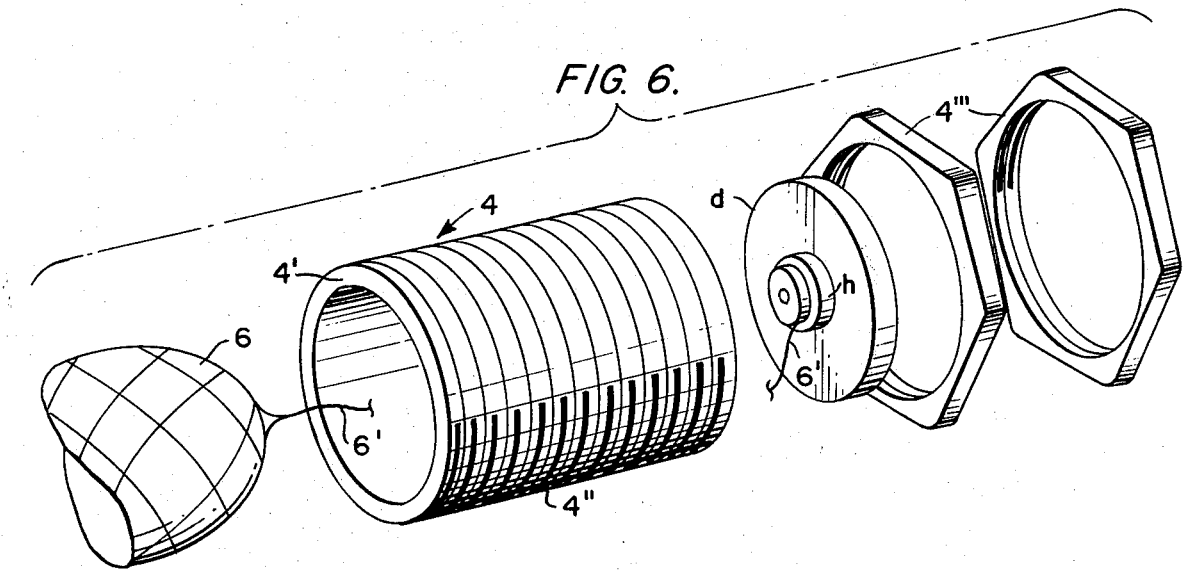
FIG. 6 is an exploded perspective view.

In one of its preferred embodiments, according to the illustrations given in the aforesaid figures, the present assembly comprises the receptacle, its air feeder connections and ozone drainage as well as the air or oxygen distributor. This assembly is formed by a cylindrical receptacle, the arrangement of which is indicated by reference numeral 1, formed by a tubular body 1a the ends of which are threaded. This tube is arranged in a vertical position and is inserted in an orifice 2a provided in a support plate 2 and held in this position by an adapting cover 3, screwed to the upper end of tube 1 above plate 2. Said adapting cover is formed by a flat cylindrical piece provided at its base with a threaded orifice 3a in which the support-connector 4 is mounted. This support-connector 4 consists of a cylindrical tube, the general arrangement of which is identified by reference 4', the outer surface of which is provided with a screw thread 4" on which the fastening nuts 4''' are mounted.

At one of its ends, tube 4'—preferably of polyvinyl-chloride, is provided at the inner perimeter of its edge, with an annular step serving to seat a cover provided by a disc -d- of the same material, the center of which carries the female part -h- of pin 4a.

The manner of mounting support-connector 4 is very simple and is accomplished as follows: the ozone generator tube 6 is inserted after the manner of a capsule into the free opening of tube 4', the diameter of tube 4' being slightly larger than that of tube 6 in order to take into account possible heat dilatation. The ozone tube 6, by means of short lead 6', is weld-connected to part -h- in order to obtained proper electric continuity.

Next, in order to mount the support-connector into the corresponding adapting cover 3, nuts 4''' are tightened to secure their attachment.

Electrode 4a of support-connector 4 is connected to the positive pole of a high-voltage line 5. This support-connector 4, as stated previously, also carries the ozone generator tube 6 consisting of a metal rod 6a connected by means of short lead 6' to connecting pin 4a, said ozone generator tube 6 being covered by a cylindrical envelope of metal mesh 6b in turn electrically connected and affixed, under electrical insulation, to adaptor 3, said generator tube 6 being housed within receptacle 1, coaxially with regard thereto.

The sidewall of receptacle 1 is provided with two threaded orifices 1b and 1c. The electrode indicated in general by reference 7 is screwed into orifice 1b, said electrode consisting of a bolt 7a the threaded part of the free end of which holds a stainless steel spiral spring 7b and the head of said bolt being affixed to a connection terminal 7c connected to the negative pole of the high-voltage line 8.

The threaded end 9a of a connection elbow bend 9 is screwed into orifice 1c, said elbow 9 having a plug-in connection end 9b.

The lower end of cylindrical receptacle 1 is closed by a flattened cylindrical cover 10 screwed onto said end and provided with a central threaded orifice 10a into which a T-shaped piece 11 has been screwed.

All these parts, in the arrangement described, provide a generating unit or module, capable of being mounted singly or forming a battery, as will be explained further on.

Apart from the foregoing, this assembly comprises an air or oxygen distributor consisting of a cylindrical tube the general arrangement of which is indicated by reference 12. This tube is closed at the ends thereof by respective covers 10' into the orifices 10a of which are connected the ends of a feed tube 13 the middle part of which is provided with a branch line 13a to be connected to the air or oxygen supply source.

The sidewall of this tube 12 has a series of orifices 12a in aligned arrangement following one of the straight generatrices of said surface, connection nipples 14 being respectively connected to each orifice.

This assembly is used and operated in the following manner, as illustrated in FIG. 1, showing a battery consisting of four generator tubes, connected to one another and to a distributor as described below.

The cylindrical receptacles 1 are arranged in a vertical position with their covers 3 upwards. Their lower T-branch-offs 11 are connected to one another by means of tubes 15, the first of which is connected to an elbow bend 11b and the last T-branch-off 11 being connected by means of pipeline 15a to a vacuum generating source.

In turn, each of nipples 14 is connected by means of pipelines 16 to corresponding elbow bends 9 of receptacles 1. Pipelines 16 join distributor 12 to each of the cylindrical receptacles 1. This they do as risers, parallel to one another, from distributor 12 towards each receptacle 1, in such a manner that the latter closest to same is connected to nipple 14 located higher up and so on successively between following nipples downwardly, correlatively connected to successive receptacles 1.

This arrangement has been devised in order to balance the flow distances between distributor 12 and the multiple outlet formed by elbow bend 11b, T-branch-off 1 and pipeline 15, in such a manner that the length of each tube 16 connecting distributor 12 with one of the cylindrical receptacles 1, plus the length of the pipeline from cover 10 of each receptacle 1 up to the outlet of aforesaid collector multiple is always constant for any receptacle 1.

Distributor 12 can be connected optionally or contain different devices designed for the treatment of arriving air or oxygen, for dehumidification, filtering, cooling, etc.

The arrangement illustrated in FIG. 1 is one of the preferred practical embodiments. Same is variable inasmuch as it is feasible to use a single cylindrical receptacle 1 or several such receptacles, according to the quantity or flow of ozone to be produced.

The functioning of this invention is simple, as will be explained in detail below.

The air or oxygen entering through branch 13a and passing through pipeline 13 reaches the interior of distributor 12.

In turn, due to vacuum or suction action applied to pipelines 15a the flow or air or oxygen passes from the distributor 12 towards each of the cylindrical receptacles 1 by means of pipelines 16 where, by means of an electric spark formed between envelope 6b, electrically connected to terminal 7c, and electrode 4a, ozone is generated. This ozone is aspirated by the combination of elbow bends 11b, T-branch-offs 11 and pipelines 13, towards the collecting arrangement.

As can be appreciated, this device offers a series of advantages, such as the hermeticity of the live pole, enabling operation with high-voltage currents; the possibility of easily forming variable batteries of receptacles containing ozone generator tubes, each of them under a constant pressure, owing to which the ozone-air flow is equal in each of them, due to the presence of pipelines 16 balancing the distances to be covered by aforesaid flow of ozone-air.

The invention as described and illustrated may be clearly understood and no further explanations will be required by those versed in the art.

It is evident that sundry alterations as to construction and details may be made without departing from the scope of the present invention, as clearly determined in the following claims.

What is claimed is:

1. An improved assembly for generating ozone, of the type comprising ozone generating tubes (6) provided with a rod electrode (6a) mounted inside said tubes and connected to a first terminal (4a) of an electric current supply, said tubes (6) covered by a metal mesh connected to a second terminal (7c) of the power supply, said generating tubes (6) housed within corresponding hermetic receptacles (1) including upper and lower covers (3,10) said receptacles (1) connected to a source of supply (12) of air or oxygen and said lower covers provided with outlet orifices (10a) connected to an ozone discharge conduit (15), characterized by a support (4) connected to said first terminal (4a) of said rod electrode (6a), said support comprising a rigid plastic cylindrical sleeve (4') provided with an outside thread (4''), one end of said support provided with an annular seat, a plastic disc (d) fitted in said seat, said first terminal (4a) inserted in said disc and connected to said rod electrode (6a), a pair of nuts (4''') securing said sleeve (4') to the cover (3) of said hermetic receptacles for said generator tubes (6), the metal mesh of the generator tubes (6) being in turn connected to the wall of said receptacle (1) by means of a helical spring (7b) affixed to the end of a threaded connector (7a) and connected to the second current supply terminal (7c), a distributor (12), riser tubes (16) connecting said distributor to each of said receptacles (1) and demountable couplings (9) connecting the end of each said riser tubes (16) to said receptacles (1) and to the distributor (12).

* * * * *